Sept. 12, 1967  H. FRANK ETAL  3,340,851
AUTOMATIC PET FEEDER

Filed Jan. 21, 1966  2 Sheets-Sheet 1

Rocco J. Logozzo
Hugo Frank
INVENTORS

BY Clarence A. O'Brien
and Harvey B. Jacobson
Attorneys

Sept. 12, 1967     H. FRANK ETAL     3,340,851
AUTOMATIC PET FEEDER
Filed Jan. 21, 1966     2 Sheets-Sheet 2

Rocco J. Logozzo
Hugo Frank
        INVENTORS

BY *Clarence A. O'Brien*
and *Harvey B. Jacobson*
        Attorneys

United States Patent Office 3,340,851
Patented Sept. 12, 1967

3,340,851
AUTOMATIC PET FEEDER
Hugo Frank, Rancho Cordova, Calif. (5417 Carmen Way, Sacramento, Calif. 95822), and Rocco J. Logozzo, Rancho Cordova, Calif. 95670
Filed Jan. 21, 1966, Ser. No. 534,561
1 Claim. (Cl. 119—51.13)

This invention relates generally to animal feeding devices and more particularly to an improved automatically operated food and water dispensing device for animals.

Briefly, this invention comprises a feeder cabinet having a food hopper therein for storing enough animal food for at least several day's feedings. Also, rotatably mounted in the cabinet below a dispensing outlet nozzle on the hopper is a plate having a plurality of food containers mounted thereon, the device including means for rotating the plate whereby said containers will successively be registered with the dispensing nozzle for receiving food from the hopper. The containers have open bottoms for successive registry with an opening in an intermediate wall in the cabinet, the wall having a trap door positioned over the opening which is caused to open when a container is aligned therewith thereby allowing the food to fall through a spout to an animal food dish. Also included in the cabinet is a water feeder operated by a floating valve to maintain a constant amount of water in a separate compartment of the food dish.

It is an object of the present invention to provide a novel portable animal feeding unit which is simple in construction, efficient in operation and will automatically dispense food and water at predetermined spaced intervals.

It is another object of the present invention to provide a self-contained feeding unit for animals which automatically dispenses the same amount of animal food at equal period intervals.

It is a further object of the present invention to provide an electrically operated automatic pet feeder for dispensing predetermined quantities of food at equal periodic intervals as well as maintaining a constant water supply for the pet using the feeder.

It is a still further object of the present invention to provide a portable pet feeder of the character described which may be economically constructed as well as being economical to operate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
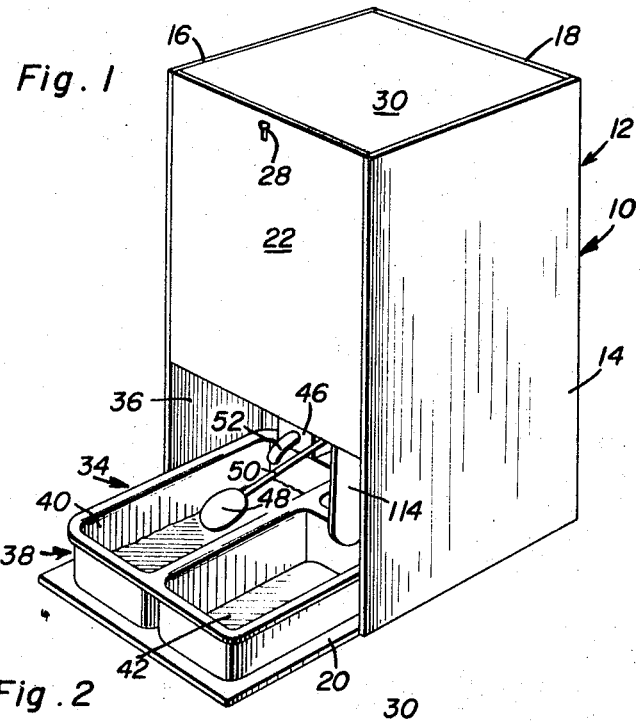
FIGURE 1 is a perspective view of the automatic pet feeding device comprising the present invention.

Referring now to the drawings in more detail, reference numeral 10 is used to generally denote the automatic pet feeder comprising the present invention. The pet feeder 10 comprises a feeder cabinet 12 including side walls 14 and 16, a back wall 18, a bottom wall 20, and a removable front cover 22. There are also included in the cabinet upper and lower horizontally disposed intermediate walls 24 and 26 which are fixedly mounted to the side walls 14 and 16 and the back wall 18 in order to be permanently fixed in the cabinet in parallel spaced apart horizontal relationship. As will be observed in FIGURES 1 and 3, for example, the front cover 22 is removably mounted on the front of the cabinet 12 by a suitable locking mechanism 28 which effectively latches the cover 22 on the cabinet, and together with the top wall 30 on the cabinet fully encloses an upper storage and dispensing compartment 32.

A feeding station generally denoted by reference numeral 34 is maintained in the cabinet below the storage and dispensing compartment 32, the feeding station 34 including an extension of the wall 20 outwardly of the front of the cabinet, the wall 20 extending through the forwardly directed opening 36 below the intermediate wall 26. A feeding tray 38 is normally placed on the extension portion of bottom wall 20, the feeding tray 38 including a water compartment 40 and food compartment 42. A water inlet conduit 44 extends through the back wall 18 of the cabinet, the conduit 44 having a suitable valve 46 thereon, the valve operated by a float 48 mounted on arm 50 in order to control the flow of water through the valve 46. Extending from the front of the valve 46 is a spout 52 for delivering water to the water compartment 40, it being readily appreciated that the float 48 will control the flow of water through the valve and thereby maintaining the water level in the water compartment 40 at a predetermined height.

Mounted within the upper storage and dispensing compartment 32 of the cabinet 12 is a food hopper generally denoted by reference numeral 54, the hopper including downwardly converging front and rear walls 56 and 58 and side walls 60. The hopper 54 may be filled with animal food such as chunk-style meat, grain, hamburger bits or the like through the opening 62 over the front wall 56 when the cover 22 is removed from the storage and dispensing compartment 32. It will be readily apparent that due to the rather large size of the hopper 54, at least several days supply of animal food may be stored therein.

Mounted at the bottom of the hopper 54 and opening thereto is an outlet dispensing nozzle 62 which comprises a generally cylindrical hollow member 64 having one end mounted in the opening 66 in the hopper 54. The outlet nozzle 62 extends downwardly and has the bottom end thereof mounted in an opening 66 in an upper intermediate wall 24. The lower end of the cylindrical member 64 is open, and an annular rubber sleeve-like member 68 is mounted over the end thereof, the annular sleeve member 68 extending downwardly slightly below the wall 24 for a purpose to be explained below. Mounted in the storage and dispensing compartment on a mounting bracket 70 which is attached at its upper end to the wall 56 of hopper 54 is a suitable electric motor 72, the motor 72 having an output drive shaft 74 which has a mounting head 76 on the outer end thereof on which is mounted a cross drive member generally denoted by reference numeral 78 which includes a pair of cross arms 80 and 82. Of course, it will be apparent that if the motor 72 is driven, the drive shaft 74 will turn thus turning the cross arms 80 and 82 in a vertical plane. The intermediate wall 24 includes an elongated slot 84 therein disposed beneath the drive member 78 whereby the arms 80 and 82 will extend downwardly through the slot 84 when the drive shaft 74 turns.

A dispensing unit generally denoted by reference numeral 86 is mounted on the lower intermediate wall 26. The dispensing unit 86 includes a plate-like member or table 88 which is rotatably mounted over the wall 26 by a threaded fastener 90 which extends through the table 88 and wall 26 and includes a rubber spacer sleeve 92 thereon for maintaining the table in a horizontal plane spaced above the wall 26. The table 88 includes a plurality of apertures therein through which are mounted a plurality of food containers generally denoted by reference numeral 94, the food containers each comprising a frustoconical member 96 open both at the top and bottom. In this embodiment of the invention, four such containers are illustrated mounted in the table 88, however, as will be readily appreciated, any preferred number of such containers could be mounted in the plate. As will be observed, the containers 96 extend below the plane of table 88 and normally rest against the lower intermediate wall 26 which effectively closes the bottom of the containers 96.

Figure 8:
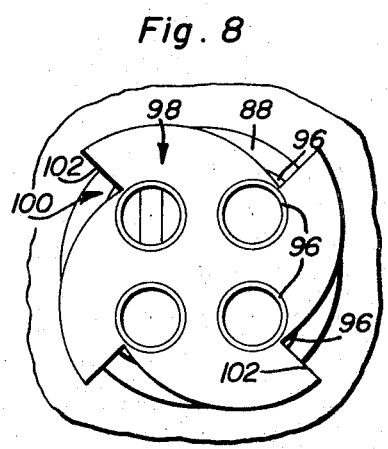
FIGURE 8 is a top plan view of the rotatable feeding unit of the present invention taken substantially on the plane of the line 8—8 of FIGURE 3.
Figure 9:
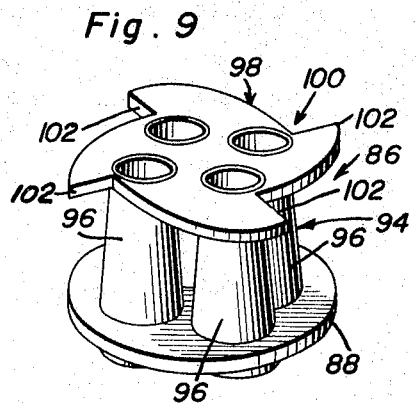
FIGURE 9 is a perspective view of the feeding unit illustrated in FIGURE 8.
Figure 5:
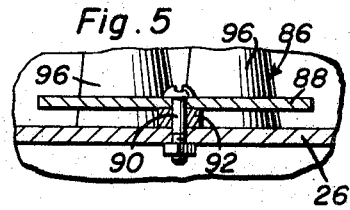
FIGURE 5 is an enlarged partial vertical sectional view taken substantially on the plane of the line 5—5 of FIGURE 3.

Referring now to FIGURES 8 and 9 in particular, it will be noted that a star wheel 98 is horizontally disposed across the upper ends of the food containers 96, the star wheel including four openings therein to receive the upper ends of the food containers 96. The star wheel 98 includes four notches generally denoted by reference numeral 100 therein, each notch having a camming face 102 disposed laterally outwardly adjacent each of the food containers 96.

Figure 2:
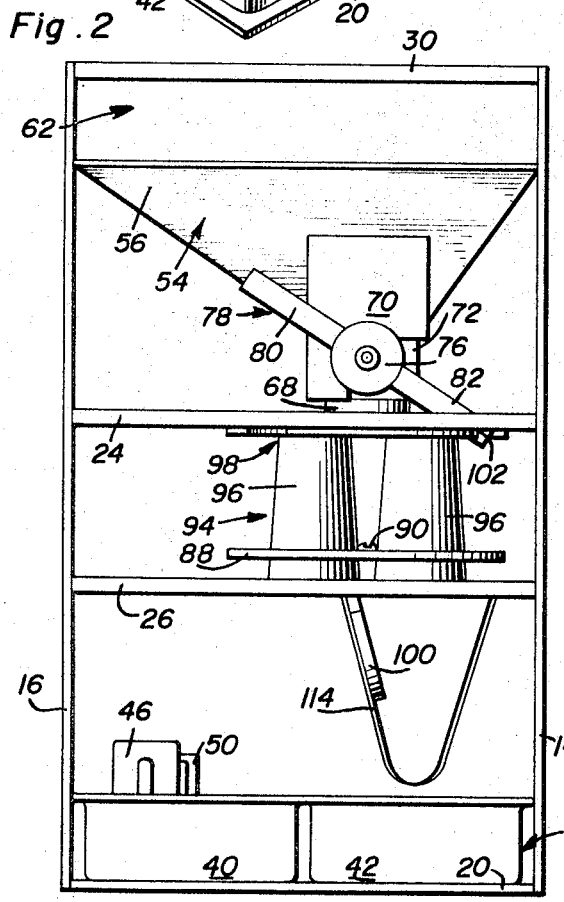
FIGURE 2 is an enlarged front elevational view of the pet feeder illustrated in FIGURE 1 with the front cover removed to disclose the internal structure thereof.
Figure 3:
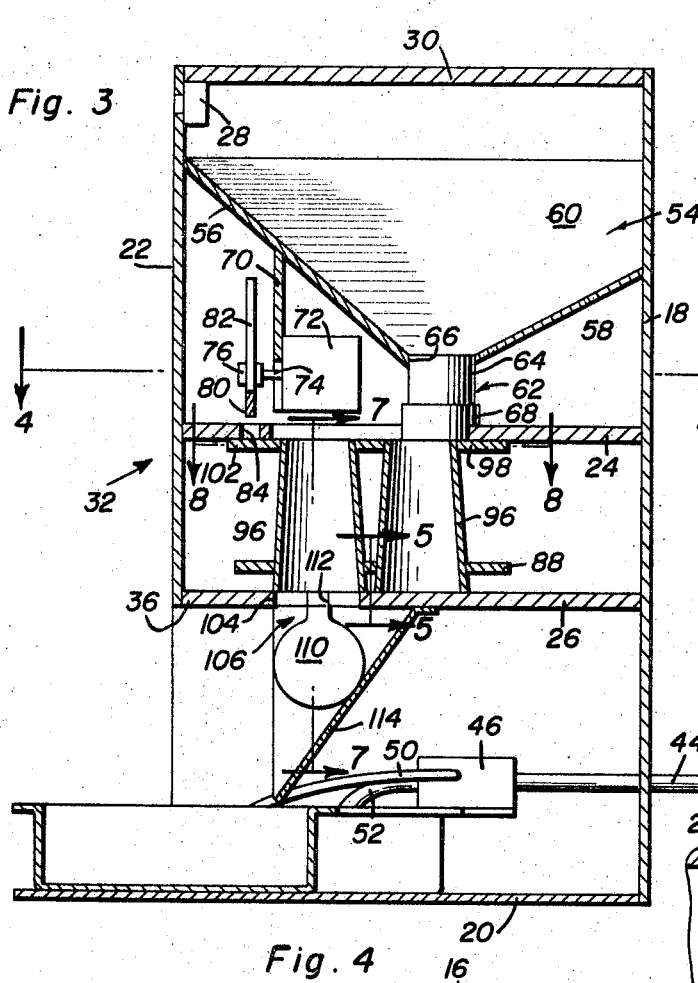
FIGURE 3 is a vertical sectional view taken longitudinally through the pet feeder illustrated in FIGURE 1.

Referring to FIGURES 2 and 3 in particular, it will be observed that the dispensing unit is disposed between the intermediate walls 24 and 26 with the star wheel 98 flush against the bottom of intermediate wall 24. Of course, as described above, the table 88 is rotatably mounted on wall 26 and thus as the motor 72 is operated and the drive member 78 rotates, the arms 80 and 82 will move downwardly through the slot 84 as illustrated in FIGURE 2 and will successively engage the cam faces 102 of star wheel 98. As the drive member 78 turns, the engagement of the arms 80 and 82 with the star wheel cam faces will cause the table 88 to rotate through one quarter revolution and, of course, the food containers 96 mounted between the table 88 and star wheel 98 will be caused to rotate. As will be apparent, the degree through which the table rotates may be computed by the formula $$\frac{360°}{\text{Number of food containers (or cam faces)}}$$

Figure 6:
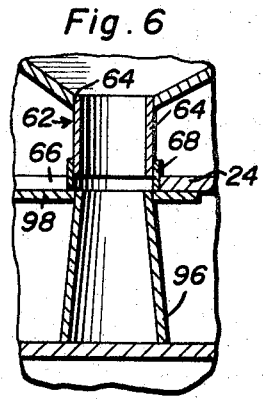
FIGURE 6 is an enlarged partial vertical sectional view of the food hooper and a single food container comprising a portion of the working elements of the instant pet feeder.

Thus, when a container 96 which has the upper end thereof open is moved into registry with the dispensing nozzle 62, the food contained in hopper 54 will fall by gravity through the nozzle and into the container, filling the container 96 and retained therein due to the closure of the open bottom thereof by the wall 26. This filling operation may be best appreciated by referring to FIGURE 6, wherein it will be also appreciated that the annular sleeve 68 which extends below the wall 24 will wipe across the top of star wheel 98 and the open end of the food container in order to wipe clean the upper face of star wheel 98.

Figure 7:
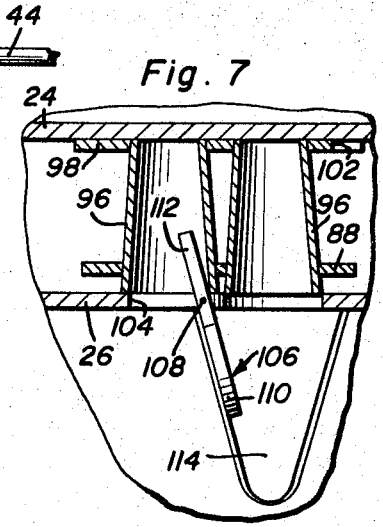
FIGURE 7 is an enlarged partial vertical sectional view taken substantially on the plane of the line 7—7 of FIGURE 3.
Figure 4:
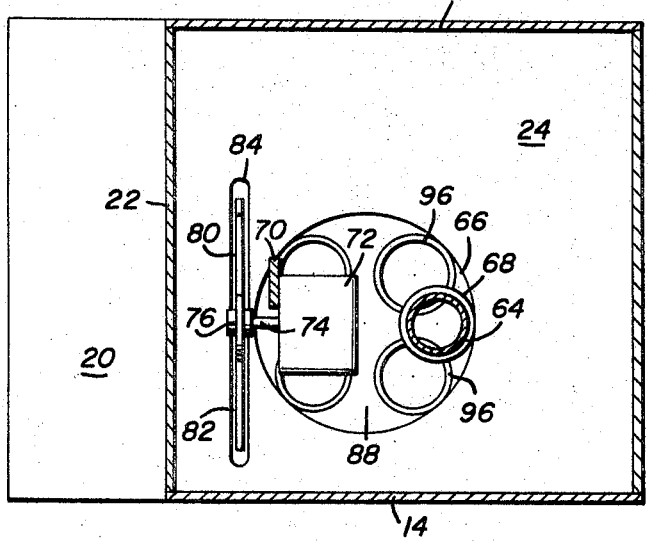
FIGURE 4 is a horizontal sectional view taken substantially on the plane of the line 4—4 of FIGURE 3.

Referring now to FIGURES 3 and 7 in particular, it will be observed that the lower intermediate wall 26 has an elongate opening 104 therein, the opening being approximately the same width as the diameter of the bottom of each of the food containers 96 and of a length slightly greater than twice such diameter. A gate member generally denoted by reference numeral 106 is pivotally mounted on pin 108 in the opening 104, the pin extending across the opening 104 and thereby mounting the gate member 106 longitudinally in the opening 104. The gate member 106 includes an enlarged head portion 110 which is generally circular and of the same diameter as the open bottoms of food containers 96, as well as a camming portion 112 which extends rearwardly from the head portion 110.

Referring again to FIGURES 3 and 7 in particular, the operation of the gate member 106 in conjunction with the dispensing unit 86 will be readily appreciated. First, a food container 96 is filled with food from the hopper 60 as explained above, the filled container being effectively closed at the bottom end by wall 26. The motor 72 is continuously operative, but is geared down in a manner well known to those skilled in the art to make one-half revolution of output shaft 74 per feeding period. Thus, if the animal is to be fed only once a day the motor 74 will be so geared to make one-half revolution each 24 hours. As the motor output shaft 74 turns, one of the arms 80 or 82 will contact the camming surface 102 in star wheel 98 and thus turn the table 88 carrying the food containers therewith. As the table 88 turns, a previously emptied food container, as for example the food container on the left in FIGURE 7, will move to the position shown in FIGURE 7 thus allowing the left end of gate 106 to freely pivot upwardly. Of course, it will be appreciated that as the head end 110 of the gate 106 is larger than the narrow camming portion 112 it is heavier, and when the table 88 rotates so as to move a previously emptied food container out of engagement with the camming portion 112, the gate will move to the position illustrated in FIGURE 7. At this time, it will be appreciated that the head portion 110 of the gate, which has previously been in closing engagement with the open bottom end of the filled container 96, will move downwardly allowing the food within the previously filled container to fall by gravity through the opening 104 into a spout 114, and then downwardly into the food compartment 42. Thus, one feeding cycle of the dispensing device 86 has been completed at this time. It will now be apparent that the right hand container of FIGURE 7 is empty, the food having fallen through the opening 104 into the food compartment 42. The arm of drive member 78 which causes the rotation of table 88 has continued its rotation out of engagement with the star wheel at this time and during its continued rotation it will drive the table 88 past the position illustrated in FIGURE 7, and thus the gate 106 will have been closed as the left hand container 96 contacts the camming portion 112 of the gate thus moving the head portion 110 upwardly into closing engagement in the aperture 104. It will of course be appreciated that continued rotation of the drive shaft 74 will ultimately cause the other drive arm of the drive member 78 to contact the next cam face of the star wheel 98 in order to achieve another feeding cycle, the following food container 96 having been filled as it moves into registry with the nozzle 62.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

An automatic food storage and dispensing device for animals comprising a cabinet, a feeding station disposed at one side of said cabinet, a food hopper disposed in the upper portion of said cabinet, a pair of parallel spaced apart walls horizontally disposed in said cabinet below said hopper, outlet means disposed between said hopper and the upper of said walls for conveying food from said hopper, means rotatably mounted on the lower of said walls for receiving food from said outlet means, and conveying means in said lower wall for selectively conveying food through said lower wall to said feeding station, said receiving means comprising a plurality of upstanding hollow members mounted on a table, said table being rotatably mounted on said lower wall, means in said cabinet for rotating said table whereby successive ones of said hollow members will register with said outlet means and thus be filled with food from said hopper, the conveying means in said lower wall comprising, an aperture in said lower wall, gate means pivotally mounted in said aperture for selectively opening said aperture in response to movement of said hollow members by said means for rotating said table whereby food will be dispensed through said aperture from successive ones of said hollow members to said feeding station.

References Cited

UNITED STATES PATENTS

| | | | |
|---|---|---|---|
| 2,193,235 | 3/1940 | Jones et al. | 222—370 |
| 2,500,243 | 3/1950 | Dixon | 119—51.13 |
| 2,969,769 | 1/1961 | Paschall | 119—56 |
| 3,031,109 | 4/1962 | Krag | 119—51 X |
| 3,196,835 | 7/1965 | Bergevin | 119—51.11 |

SAMUEL KOREN, *Primary Examiner.*

HUGH R. CHAMBLEE, *Examiner.*